May 26, 1970 S. R. PADUCH 3,513,899
FUEL CONTROL DECELERATION MODE
Filed March 29, 1968

INVENTOR
STANLEY R. PADUCH

3,513,899
FUEL CONTROL DECELERATION MODE
Stanley R. Paduch, Somers, Conn., assignor to United
Aircraft Corporation, East Hartford, Conn., a corporation of Delaware
Filed Mar. 29, 1968, Ser. No. 717,135
Int. Cl. F02c 9/14, 9/08, 3/06
U.S. Cl. 60—39.27                      1 Claim

ABSTRACT OF THE DISCLOSURE

A gas turbine engine fuel control provides a hydraulic signal to the engine intercompressor bleeds when the engine is operating on the deceleration schedule in addition to the normal function of scheduling deceleration fuel flow.

BACKGROUND OF THE INVENTION

This invention relates to fuel controls for gas turbine engines and more specifically relates to an improvement over the normal function of scheduling deceleration fuel flow.

Specifically, this invention relates to providing a hydraulic signal generated by the fuel control to an engine-mounted actuator to open intercompressor bleeds during engine deceleration.

Hydromechanical fuel controls are used to regulate the thrust output of advanced gas turbine engines are designed to provide maximum reliability and endurance while monitoring the engine within specific operational limits. These controls schedule the engine fuel flow accurately during engine starting, acceleration and deceleration. Further the fuel control maintains steady state engine speed at all altitudes, aircraft speeds and temperatures, thereby assuring that the engine is contained within its operational limits. It is apparent that the function of the fuel control is to automatically control the engine operation within specified limits, thereby enabling the pilot to devote maximum time to operation of the aircraft.

This invention is devoted to an improvement in the fuel control deceleration mode. In the prior art, numerous controls have provided a signal to operate the engine intercompressor bleeds as a function of power lever position or engine speed. These techniques are well known in the art.

Deceleration occurs when the amount of fuel supplied to the engine is less than the steady state requirement of the engine. When decelerating an engine from high power to low power, care must be taken to optimize the engine's rate of deceleration. An unusually rapid deceleration may cause compressor stall due to the extreme sensitivity of the axial flow compressors to flow distortion associated with transient operation. Stall is a broad term used to designate various types of compressor distress which may be termed compressor surge, compressor stall, blade flutter, transient mismatch of high and low compressors and the like. While various theories are advanced as to the cause and solution of stall problems, experimentation is typically necessary to determine what actually is occurring. During the development of an advanced engine with a high rotational movement of inertia, it was learned that the intercompressor bleeds must be opened during operation on the deceleration schedule. This is an unanticipated problem. A rapid deceleration occurs when the control schedules a fuel flow significantly lower than the steady-state requirement. The extremely low flows associated with rapid decelerations may cause burner flame out. It is often the case that intercompressor bleeds must be opened on deceleration regardless of the rate of deceleration. Deceleration continues until the governor droop linkage (power lever) overrides the deceleration limiting schedule thereby increasing the fuel flow to the steady state requirement.

I have devised a scheme which will eliminate these problems, wherein the bleeds can be opened and held open without requiring the measurement of a rate of deceleration. The scheme provides a simple, reliable means of opening the bleeds as a function of the control and/or engine deceleration schedule.

SUMMARY OF THE INVENTION

One feature of this invention is the generation of a signal that is a function of the engine deceleration operating schedule.

Another feature of this invention is the generation of a hydraulic signal that is a function of the engine deceleration schedule in addition to the normal function of scheduling deceleration fuel flow.

A further feature of this invention is the provision, during engine deceleration, of a hydraulic signal which is supplied to an engine-mounted actuator to open the engine bleeds. Further, an override system is also provided to insure that a normal bleed closed pressure signal is supplied to the actuator when the fuel control is operating on minimum fuel flow settings.

DESCRIPTION OF THE PREFERRED EMBODIMENT

Figure 1:
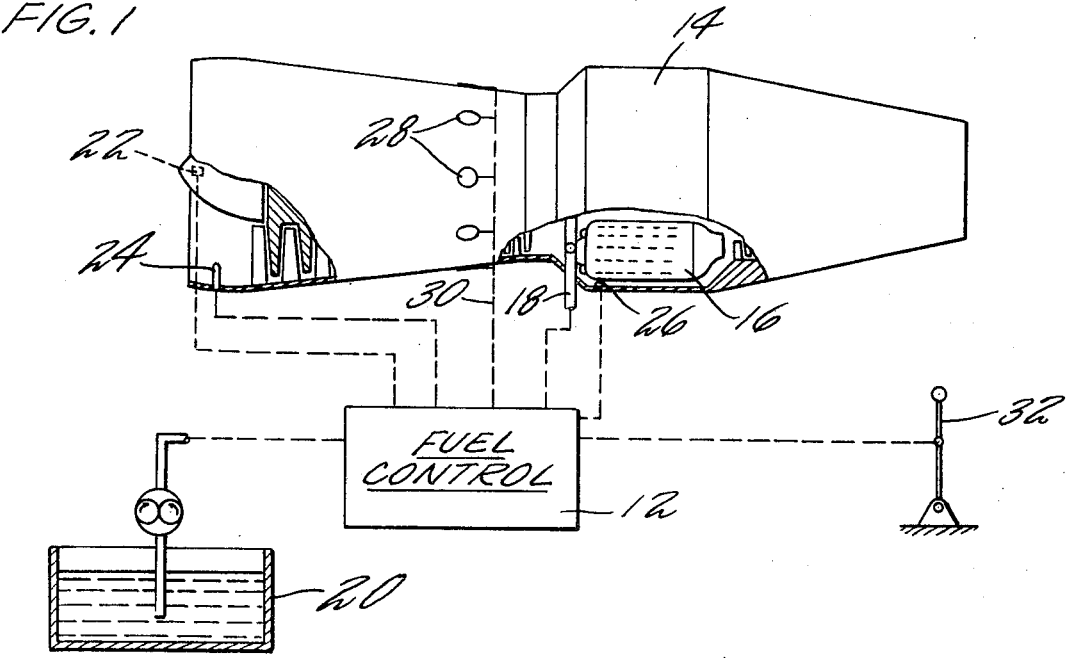
FIG. 1 is a fragmentary view of a gas turbine engine having a control installation according to this invention.

Referring to FIG. 1, an axial flow, gas turbine engine is illustrated as incorporating this invention, but it is apparent that this invention is equally suitable for use in various other engine arrangements. The engine has a fuel control 12 for computing and metering the fuel flow to the combustion section 14 of the gas turbine engine.

The combustion section of the engine includes a plurality of burners 16 and a fuel manifold 18 leading to the burners. Fuel ($wf$) is supplied from the tank 20 through the fuel control 12 to the fuel manifold 18 in conventional fashion. The rotational speed (N) of the engine is obtained by sensor 22 and the signal is relayed to the fuel control 12. Probe 24 senses compressor inlet total temperature and the signal is relayed to the fuel control. Probe 26 senses burner presure ($Pb$) and relays the pressure to the fuel control.

Burner pressure is commonly used as a basic fuel control parameter. While burner pressure is preferred, compressor discharge pressure or other pressures in this area of the engine can be used to regulate fuel flow.

The control system is externally actuated and regulated by the pilot's manipulation of the power lever 32 for speed governing in the aircraft cockpit. The fuel control provides the additional feature of providing a signal as a function of operating on the deceleration schedule, through line 30 to a plurality of circumferentially spaced, intercompressor bleed valves 28. The various ways in which these parameters may be utilized in controlling the engine are more clearly described in connection with FIG. 2.

Figure 2:
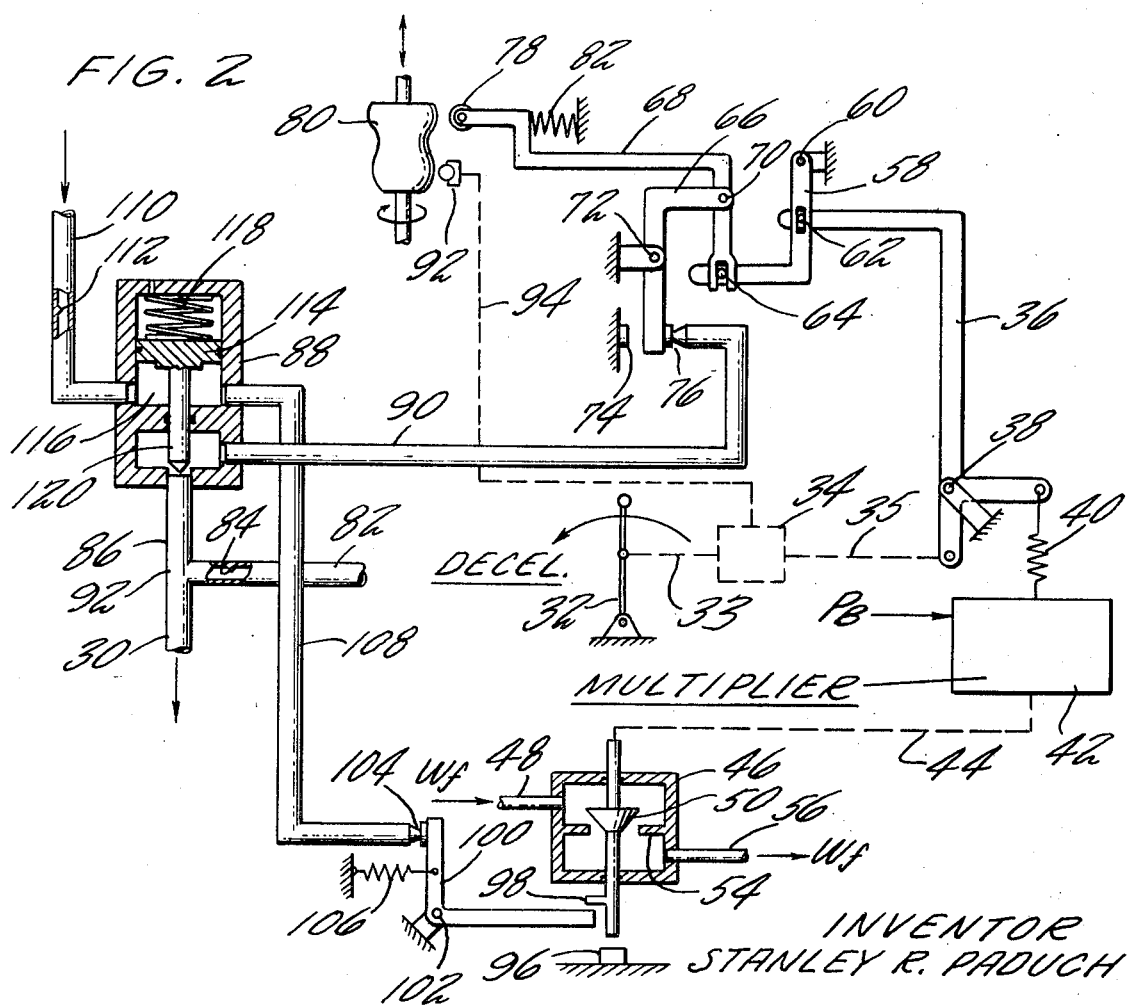
FIG. 2 is a schematic illustration of a fuel control deceleration linkage incorporating the subject matter of this invention.

A fuel control embodying this invention is schematically illustrated in FIG. 2. Generally, the fuel control meters the fuel flow as a function of $Wf/Pb$. Hence the ratio unit of $Wf/Pb$ is a basic control parameter that is scheduled as a function of compressor rotor speed. As previously discussed, compressor inlet total temperature and the like, are often called on to "bias" the $Wf/Pb$ ratio unit. This control parameter is currently used on many multiengine commercial aircraft installations. Deceleration limiting is induced as a force in the system proportional to $Wf/Pb$ that is a function of the rotational speed (N) of the engine and may be biased by various parameters such as the compressor inlet air temperature. The interaction of these parameters during the fuel control deceleration mode will be described hereinafter.

The system is disposed in a control cavity and is shown in the steady state operating mode. To decelerate, power lever 32 is pulled back by the pilot as shown by the arrow in FIG. 2. This movement generates signals 33 and 35 through the engine speed control 34 to the link 36 causing a clockwise movement of link 36 around pivot 38. This rotation causes a downward movement of the $Wf/Pb$ ratio unit spring 40 which is fed into a multiplier shown as 42.

The burner pressure is imposed upon the mulutiplier 42 is such fashion that the input of the ratio unit spring can be multiplied by the burner pressure so as to produce a signal 44, which corresponds to the desired fuel flow, to the throttle valve 46. The burner pressure system is more completely explained in a co-pending application U.S. Ser. No. 717,194 of Urban et al., having a filing date of Mar. 29, 1968 and assigned to the same assignee as the present invention. High pressure fuel is provided through inlet 48 to the throttle valve 46 where signal 44 adjusts the position valve 50 such that the flow area, or gap 52 between the position valve and the orifice 54 may be controlled to obtain a desired fuel flow. A pressure regulator (not shown) maintains a constant pressure difference across this flow area. The multiplier signals the position valve to meter high pressure fuel. The metered fuel exits from the throttle valve through outlet 56 and is directed to the fuel manifold 18 of the burner. Thus, it is apparent that a counter-clockwise movement of the power lever 32 is able to reduce the fuel flow to the engine. It is to be understood that the input signals 33 and 35 are limited by the deceleration linkage so that the rotation of link 36 around pivot 38 can be prevented from moving the ratio unit spring 40 downward past the position desired during deceleration.

The operation of the deceleration linkage will be described hereinafter. As link 36 rotates clockwise, link 58 is required to rotate counter-clockwise around pivot 60 by virtue of the connection at pin 62. This motion causes point 64 to move essentially to the right. The movement of point 64 on link 58 causes a combined reaction in the bell crank 66 and the follower 68. Pin 70 joins bell crank 66 to the follower 68. As the point 64 moves to the right, link 68 rotates counterclockwise about pin 70, until follower 78 contacts cam 80. During this sequence, bell crank 66 is grounded against flapper valve 76 by virtue of the force generated by spring 82. When follower 78 contacts cam 80, the moment generated by spring 82 on bell crank 66 is removed, and spring 40 and flapper valve pressure acting on the flapper valve area generate a clockwise moment on bell crank 66 to open the flapper valve.

At this point, the deceleration schedule fuel flow ratio unit $Wf/Pb$ cannot be further reduced until the cam 80 is rotated or translated.

A high-pressure hydraulic fluid is provided by conduit 82 having a restriction 84. The supply conduit 82 leads past the restriction to a T 92. Conduit 86 connects to T 92 and leads through a deceleration bleed override valve indicated generally as 88, to conduit 90 leading to the flapper valve 76. The remaining leg of the T connects to line 30 and leads to the engine-mounted deceleration bleed valve as shown on FIG. 1. Line 30 forms a closed system. When flapper valve 76 is closed, high-pressure fluid from conduit 82 fills conduits 86, 90 and line 30. It is apparent that when the flapper valve opens, high pressure fluid in line 30 drains from the system, downstream of the restriction 84, to the control cavity. This drain creates a reduced pressure signal in line 30 leading to the compressor bleed actuator. The restriction 84 in the conduit 82 prevents the high pressure fluid from increasing the pressure in the line 30 as long as fluid is allowed to drain through the flapper valve to the control cavity.

The three-dimensional cam is contoured to define the deceleration $(Wf/Pb)$ schedule. The three-dimensional cam is shown as having a vertical motion dependent upon compressor rotor speed and a rotational motion which is dependent upon the compressor inlet total temperature. The cam position determines the limiting deceleration linkage position thus establishing a limiting $Wf/Pb$ ratio. Consequently, the cam defines the engine deceleration schedule or $Wf/Pb$ ratios to avoid the deceleration stall and the burner flame out limits without compromising the engine deceleration time.

The remotely-mounted temperature probe 24 provides a signal which is transmitted to the main control. This signal is responsible for the rotational position of the three-dimensional cam.

As an example, during full deceleration, the power level is pulled back. This rotates link 36 shifting the ratio unit spring 40 downward only so far as the deceleration linkage will allow, since the ball follower 78 engages the cam 80 to prevent a lower ratio from being reached. The downward movement of the ratio unit spring 40 is such as to monitor the deceleration fuel flow through the position valve 50 in the throttle valve 46. The flapper valve 76 opens, venting the conduit 90 to the control cavity thereby creating a reduced pressure signal in line 30 leading to the intercompressor bleed valve.

Steady state operation is achieved by comparing the actual rotational speed with the desired rotational speed as selected by the pilot through the positioning of the power lever. The comparison occurs in the engine speed control unit 34. As stated, the three-dimensional cam 80 translates depending upon actual speed. Follower 92 senses actual speed and transmits a feedback signal 94 to the speed control unit 34. When the actual speed compares with the desired speed, the engine speed control unit cancels the signal 35 which relaxes the force tending to rotate link 36. The deceleration linkage returns to the normal steady position and the flapper valve closes. The engine speed control unit forms no part of the present invention and will not be described in detail.

A minimum flow override system has been provided to prevent the generation of the reduced pressure signal. When the engine is operating on minimum fuel flow, stop 96 prevents the position valve 50 from moving past a predetermined position defined by a gap 52 corresponding to the size opening which will meter the minimum fuel flow. As the position valve 50 bottoms against minimum flow stop 96, flange 98 engages the bell crank 100. The bell crank 100 moves around pivot 102 to open flapper valve 104. The force imposed by flange 98 is sufficient to overcome the spring 106 which maintains the flapper valve 104 in the closed position during normal operation. Once flapper valve 104 is opened, fluid from conduit 108 is vented to the control cavity. A high pressure fluid supply line 110, having restriction 112, provides fluid to conduit 108. Supply conduit 110 is connected to the conduit 108 through the deceleration bleed override valve indicated generally as 88. The bleed override valve contains a piston 114 which defines, with the housing, chamber 116 containing the high pressure fluid. As the flapper valve 104 opens, high pressure fluid drains from the conduit downstream of the restriction 112 and reduces the pressure in chamber 116. At this time the compression spring 118 operates on the piston 114, shifting the valve stem 120 downward to close off conduit 86, and restoring the pressure level in line 30 to its maximum value.

As an example, assume that flapper valve 76 opens on deceleration. If the control is scheduling minimum flow, the minimum fuel flow flapper valve 104 opens, thereby reducing the pressure in chamber 116. Valve stem 120 moves downward to seal off conduit 86. Thus, the high pressure fluid in conduit 82 cannot drain through conduits 86 and 90. As a result, a low pressure signal is not sent through line 30 to the inter-compressor bleed valves. Summarizing, this override provision insures that a normal high pressure signal is supplied to the bleed actuators when the control is operating on minimum fuel flow settings while in the deceleration mode. An increase in fuel flow above the minimum settings permits the position valve 50 to move upwardly thereby allowing the spring 106 to rotate the bell crank to close the flapper valve. Once the flapper valve is closed, high pressure fluid fills chamber 116 and conduit 108 thereby raising the valve stem 120. It is understood that operation at fuel flows above the minimum permits the signal to be generated in the normal manner.

As a result of this description, and the accompanying drawings, it is apparent that an improved fuel control has been provided having particularly novel features. Although a preferred embodiment of this invention has been illustrated, it is apparent that various changes and modifications may be made in this arrangement without departing from the scope of this invention.

I claim:

1. In a control for computing and metering the fuel flow to the combustion section of a gas turbine engine, the control having an acceleration schedule, a deceleration schedule, and a power lever input for speed governing, the improvement in bleeding air from a plurality of compressor bleed valves circumferentially spaced around the periphery of the gas turbine engine compressor which comprises in combination:

a source of high pressure fluid supplying a high pressure signal from the control to the compressor bleed valves to maintain the bleeds closed;

means for sensing fuel flow limiting on the control deceleration schedule;

means for venting the high pressure fluid signal transmitted to the compressor bleed valves whenever sensing limiting fuel flow on the control deceleration schedule to open the compressor bleed valves thereby improving compressor tolerance to stall;

means for scheduling a minimum fuel flow; and an override means provided to prevent the venting of the high pressure fluid signal to the compressor bleed valves, said override means being responsive to operation at minimum fuel flow.

References Cited

UNITED STATES PATENTS

| | | | |
|---|---|---|---|
| 2,970,435 | 2/1961 | Winters et al. | 60—39.28 |
| 2,978,166 | 4/1961 | Hahn | 60—39.29 X |
| 3,006,145 | 10/1961 | Sobey | 60—39.29 |
| 3,080,712 | 3/1963 | Wood | 60—39.29 |
| 3,091,080 | 5/1963 | Crim et al. | 60—39.29 X |
| 3,115,006 | 12/1963 | Farkas | 60—39.28 X |
| 3,172,259 | 3/1965 | North | 60—39.27 |
| 3,267,670 | 8/1966 | McCombs | 60—39.28 |

A. LAWRENCE SMITH, Primary Examiner

U.S. Cl. X.R.

60—39.28, 39.29